Patented Nov. 19, 1940

2,221,820

UNITED STATES PATENT OFFICE 2,221,820

CYCLOALKYL-PHENOTHIOXINE COMPOUNDS

Frank B. Smith and Harold W. Moll, Midland, Mich., assignors to The Dow Chemical Company, Midland, Mich., a corporation of Michigan No Drawing. Application May 10, 1939,
Serial No. 272,817

11 Claims. (Cl. 260—327)

This invention relates to derivatives of phenothioxine and is particularly concerned with cycloalkylated phenothioxine compounds having the formula

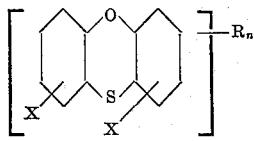

wherein R represents a cycloalkyl radical, each X represents phenyl, lower alkyl, halogen, or hydrogen, and $n$ is an integer, and a method for preparing the same. The term "cycloalkyl radical" as hereinafter employed includes such groups as cyclobutyl, cyclopentyl, cyclohexyl, methyl-cyclohexyl, chloro-cyclohexyl, isopropyl-methyl-cyclohexyl, cyclohexyl-cyclohexyl, phenyl-cyclohexyl radicals, and the like. The expression "lower alkyl" refers to alkyl groups containing from 1 to 8 carbon atoms, inclusive.

The compounds falling within the scope of the foregoing formula are for the most part high-boiling liquids, soluble in many organic solvents, and substantially insoluble in water. They are useful as modifiers in plastic compositions, as intermediates, as anti-oxidants, as gum inhibitors, and as insecticidal toxicants.

Our new compounds may be prepared by reacting phenothioxine or halogen, alkyl, or phenyl substituted phenothioxine with a cycloalkylating agent, e. g. cyclohexene, cyclopentanol, 2-methyl-5-isopropyl-cyclohexyl chloride, etc., under such conditions of temperature and pressure and in the presence of such catalysts as favorably influence the introduction of one or more cycloalkyl radicals into one or both of the phenyl nuclei of the phenothioxine group. Where cycloalkenes or hydroxy-cycloalkanes are employed, the reaction may be conveniently carried out in the presence of an acid activated bleaching earth such as Retrol. Where cycloalkyl- or substituted cycloalkyl-halides are employed, aluminum bromide or aluminum chloride are suitable as catalysts. In carrying out the reaction, any suitable amounts of phenothioxine and cycloalkylating agent may be heated together in the presence of the catalyst to obtain the desired compounds, a mixture of the mono- and polycycloalkylated products being obtained regardless of the proportions employed. We generally use from 0.3 to 3 molar equivalents of the cycloalkylating agent per mole of phenothioxine compound. The temperature required to cause reaction is between about 125° and 300° C., although somewhat lower temperatures may sometimes be employed. The reaction mixture is heated to the required temperature for a period of time required to produce cycloalkylation, and the mixture cooled, filtered to remove catalyst, washed with water, and fractionally distilled under reduced pressure to separate out the desired compounds.

Example 1

430 grams (2.12 moles) of phenothioxine and 20 grams of Retrol (a representative acid activated bleaching earth) were mixed together in a glass flask fitted with a reflux condenser, mechanical stirrer, and thermometer. The mixture was heated to 200°–210° C. and 176 grams (2.12 moles) of cyclohexene added portionwise over a period of 2.5 hours. Heating of the mixture was continued for ½ hour, after which the crude product was cooled to 150° C. and filtered to remove catalyst. The filtrate was fractionally distilled under reduced pressure, whereby there was obtained 185 grams of a mono-cyclohexyl-phenothioxine product boiling at 232°–238° C. at 20 millimeters pressure and having a specific gravity of 1.167 at 25°/25° C. A higher fraction boiling at 300°–360° C. at 3.5 millimeters consisted of 86 grams of a dicyclohexyl-phenothioxine product having a specific gravity of 1.126 at 60°/60° C. As a residue from the fractionation, there was obtained 95 grams of a polycyclohexyl-phenothioxine product as a viscous, amber oil boiling with decomposition above 360° C. at 3.5 millimeters pressure.

20 parts by weight of the monocyclohexyl-phenothioxine product was dispersed through 80 parts of diatomaceous earth to form a contact insecticidal composition. 15 pounds of this composition was suspended in 100 gallons of water to obtain a dispersion containing 3 pounds per 100 gallons of the phenothioxine derivative. This composition, when tested against oak leaf roller, was found to be 100 per cent effective in 4 days. A similar mixture of the dicyclohexyl-phenothioxine product with diatomaceous earth at 25 pounds per 100 gallons or 5 pounds of the toxicant per 100 gallons also gave a control of 100 per cent against oak leaf roller in 4 days. Lead arsenate at 3 pounds per 100 gallons controlled only 40 per cent of the test organism in 4 days.

Example 2

117.3 grams (0.5 mole) of 3-chloro-phenothioxine (melting point 88°–88.5° C.), 41 grams (0.5 mole) of cyclohexene, and 7 grams of Retrol were reacted together substantially as described in Example 1 at temperatures increasing from 200° C. to 250° C. Upon fractional distillation of the yellow, fluorescent oil so formed, there was obtained 45 grams of a monocyclohexyl-3-chloro-phenothioxine product boiling at 215°–231° C. at 4 millimeters pressure and having a refractive index of 1.6278 at $\overset{20}{\text{D}}$ a mixed mono- and dicyclohexyl-3-chloro-phenothioxine product in the amount of 12 grams boiling at 235°–260° C. at 5 millimeters pressure; and a dicyclohexyl-3-chloro-phenothioxine product boiling at from 260° C. at 5 millimeters to 270° C. at 3 millimeters pressure. As a residue from this fractionation, there was obtained a brown, resinous material liquid at elevated temperatures and consisting of a mixture of polycyclohexyl-3-chloro-phenothioxine compounds.

A 20–80 mixture of the monocyclohexyl-3-chloro-phenothioxine product with diatomaceous earth was prepared as described in Example 1. At 3 pounds of the toxicant per 100 gallons of water, this compound killed 100 per cent in 3 days when tested against southern army worms. Lead arsenate at a concentration of 3 pounds per 100 gallons controlled only 60 per cent of the test insects in 3 days.

*Example 3*

In a similar manner, 248.4 grams (0.9 mole) of 1-phenyl-phenothioxine (melting at 70.5°–71.5° C.), 73.8 grams (0.9 mole) of cyclohexene, and 12.4 grams of Retrol were reacted together and the crude product fractionated to obtain 120.5 grams of a mixture of monocyclohexyl-1-phenyl-phenothioxine compounds boiling at 215°–270° C. at 3.5 millimeters pressure and having a specific gravity ranging between 1.091 and 1.156 at 60°/60° C. A dicyclohexyl-1-phenyl-phenothioxine product in the amount of 51 grams was also obtained as a thick, viscous oil boiling at 270°–330° C. at 3.5 millimeters pressure.

By substituting other phenyl, alkyl or halogen substituted phenothioxine compounds for those shown in the examples, other cycloalkylated derivatives may be prepared. Representative of such compounds are monopropyl-phenothioxine boiling at 245°–264° C. at 20 millimeters pressure and having a specific gravity of 1.134 at 25°/25° C.; diethyl-phenothioxine boiling at 215°–226° C. at 20 millimeters pressure and having a specific gravity of 1.177 at 25°/25° C.; 3-tertiary-octyl-phenothioxine; and the like. The preparation of a number of these compounds is described in our co-pending application Serial No. 272,816, filed concurrently herewith. Also, phenothioxine compounds such as 2.7-dimethyl-phenothioxine, 2.7-dichloro-phenothioxine, 3-bromo-phenothioxine, 3.6-dibromo-phenothioxine, 3.6-dichloro-phenothioxine, 1-methyl-phenothioxine, 6-chloro-3-methyl-phenothioxine, and the like may be employed. Among other cycloalkylating agents which may be substituted for the cyclohexene shown in the examples are cyclobutylene, cyclopentene, 2-methyl-5-isopropyl-cyclohexene, 2-methyl-cyclohexene, 4-chloro-cyclohexene, cyclohexyl-cyclohexanol, phenyl-cyclohexanol, and the like.

While the foregoing examples have described the use of "Retrol" as a representative acid activated bleaching earth, it is to be understood that the invention is in no instance limited to the use of this particular product. "Retrol" is a commercially available material, representative of the acid activated bleaching earth class. This type of material may also be identified as a surface-active siliceous clay catalyst.

Other modes of applying the principle of our invention may be employed instead of those explained, change being made as regards the materials employed, provided the products or steps set forth in the following claims be thereby obtained or followed.

We therefore particularly point out and distinctly claim as our invention:

1. A compound having the formula

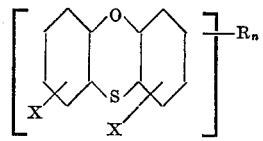

wherein R represents a cycloalkyl radical, each X represents a member of the group consisting of phenyl, lower alkyl, halogen and hydrogen, and $n$ is an integer.

2. A cyclohexylated phenothioxine compound having the formula

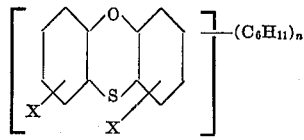

wherein each X represents a member of the group consisting of phenyl, lower alkyl, halogen and hydrogen, and $n$ is an integer.

3. A cycloalkylated phenothioxine having the formula

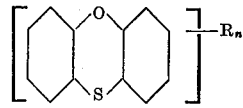

wherein R represents a cycloalkyl radical, and $n$ is an integer.

4. A cyclohexylated phenothioxine having the formula

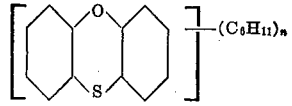

wherein $n$ is an integer.

5. Monocyclohexyl-phenothioxine.
6. Monocyclohexyl-3-chloro-phenothioxine.
7. Monocyclohexyl-1-phenyl-phenothioxine.

8. In a method for the preparation of cycloalkylated phenothioxine compounds, the steps of mixing a cycloalkylating agent selected from the group consisting of the cycloalkenes and hydroxy-cycloalkanes with a member of the group consisting of phenothioxine and halo, lower alkyl, and phenyl-phenothioxines, and heating the mixture in the presence of an acid activated bleaching earth.

9. In a method for the preparation of cycloalkylated phenothioxine compounds, the steps of mixing a cycloalkylating agent selected from the group consisting of the cycloalkenes and hydroxy-cycloalkanes with a member of the group consisting of phenothioxine and halo, lower alkyl, and phenyl-phenothioxines, and heating the mixture to a temperature between 125° and 300° C. in the presence of an acid activated bleaching earth.

10. In a method for the preparation of cyclohexylated phenothioxine compounds, the steps of mixing cyclohexene with a member of the group consisting of phenothioxine and halo, lower alkyl, and phenyl-phenothioxines, and heating the mixture in the presence of an acid activated bleaching earth.

11. In a method for the preparation of cycloalkylated phenothioxine, the steps of mixing a cycloalkylating agent selected from the group consisting of the cycloalkenes and hydroxy-cycloalkanes with phenothioxine, and heating the mixture in the presence of an acid activated bleaching agent.

FRANK B. SMITH.
HAROLD W. MOLL.